Figure 1:
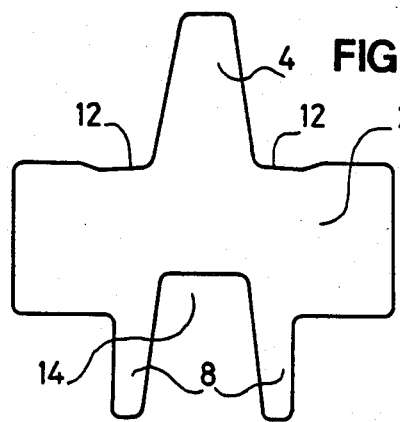

United States Patent [19]

Damkjär

[11] Patent Number: 4,676,368
[45] Date of Patent: Jun. 30, 1987

[54] CONVEYOR CHAIN HAVING LINKS OF SHEET MATERIAL

[76] Inventor: Poul E. Damkjär, Markvangen 20, Vejle, Denmark

[21] Appl. No.: 867,092

[22] Filed: May 27, 1986

Related U.S. Application Data

[63] Continuation of Ser. No. 563,391, Nov. 28, 1983, abandoned.

[30] Foreign Application Priority Data

Mar. 26, 1982 [DK] Denmark ............................ 1381/82

[51] Int. Cl.⁴ .............................................. B65G 17/06
[52] U.S. Cl. .................................... 198/852; 198/853
[58] Field of Search ............... 198/851, 852, 853, 707, 198/850

[56] References Cited

U.S. PATENT DOCUMENTS

| | | | |
|---|---|---|---|
| 2,009,157 | 7/1935 | Zilles et al. | 198/850 |
| 2,695,095 | 11/1954 | Anderson | 198/850 |
| 3,279,586 | 10/1966 | Kampfer | 198/852 |
| 3,520,398 | 7/1970 | Thomson | 198/852 |
| 3,529,715 | 9/1970 | Mueller | 198/852 |
| 3,706,200 | 12/1972 | Mueller | 198/850 X |
| 3,776,349 | 12/1973 | Kampfer | 198/852 |

FOREIGN PATENT DOCUMENTS

| | | | |
|---|---|---|---|
| 3116365 | 6/1982 | Fed. Rep. of Germany | 198/851 |
| 52-15066 | 2/1977 | Japan | 198/852 |
| 2108920 | 5/1983 | United Kingdom | 198/852 |

Primary Examiner—Joseph E. Valenza
Assistant Examiner—Jonathan D. Holmes
Attorney, Agent, or Firm—Antonelli, Terry & Wands

[57] ABSTRACT

In a conventional bottle conveyor chain, in which sheet metal chain links are joined by a hinge between the links formed by a transverse pin mounted through two outer hinge parts constituted by rolled up plate strips projecting from one link, and a broad middle hinge part made as a rolled up strip projecting from the other link, the hinge pin is narrower than the middle hinge part, whereby the links are mutually transversely pivotal, for horizontal curve driving of the chain. For increasing the pivotability without weakening the chain, the front edge of the middle hinge part is maintained at full width, but the outer end of the rolled up strip is formed with a considerably reduced width.

4 Claims, 5 Drawing Figures

CONVEYOR CHAIN HAVING LINKS OF SHEET MATERIAL

This application is a continuation of U.S. Ser. No. 563,391, filed Nov. 28, 1983 now abandoned.

The present invention relates to a conveyor chain for a bottle conveyor type, with chain links of the chain being, preferably formed of a stainless sheet steel, and with the chain links being hinged together by transverse hinge pins through hinge parts including rolled up strip portions protruding from the respective front and rear edges of the single links in such a manner that the links of each pair of interhinged chain links are mutually pivotal not only about the normally horizontal hinge pin, but also about a vertical axis through the middle point of the hinge joint, such that the chain is guidable through curves in the horizontal plane. For enabling this, the single chain links are shaped with upper link plate portions, which are transversely outwardly converging to enable the link plates, when passing through horizontal curves, to pivot laterally as required without having to overlap each other, this being desirable because the upper carrier surfaces should preferably be located in a common horizontal plane. On the other hand, it has to be accepted, then, that open triangular areas will be present along the side edges of the chain. These areas, of course, should not be open more than corresponding to the areas being completely closed when the chain passes through horizontal curves with the maximum curvature of the conveyor system, and in practice, such maximum curvature has traditionally been a curvature corresponding to a curvature radius of about 45 cm.

It would be generally acceptable that the said triangular areas were still larger, i.e. corresponding to a chain movement through curves of still higher curvature, but the hinge connections set up certain limits for the mutual pivotability of the chain links. An increased pivotability of the chain links has been desired by both manufacturers and users of conveyor chains of the aforementioned type, because an increased pivotability will allow use curves of increased curvature in the conveyor system, and in practice, the important consequence would be that instead of using curved guiding rails for supporting the chain through a given curve it would be possible to use a lying sprocket wheel, which would considerably reduce conveying friction as compared to stationary, curved guiding rails. These considerations are well known, inasfar as with other types of conveyor chains, such as, for example, chains consisting of plastic chain links, wherein it has been possible to provide for a pivotability of the chain links which is high enough to make chains of that type guidable through horizontal curves having a radius of curvature of some 20-25 cm, whereby it is a paractical possibility to replace a stationary, curved guiding or sliding rail by a lying sprocket wheel of reasonable dimensions.

However, as far as plastic chain links are concerned, the hinge parts are easily provided with an interior conical or double conical shape, which favors a high lateral pivotability. It has been endeavored to obtain a similar effect in connection with chain links of sheet metal, such as, for example, by die pressing the hinge parts, but the desired result has not been obtained, and, such an extra operation would be highly undesirable and costly in the mass production.

Since metal chain links are produced by mass production, the links have been subjected to a minute development and optimizing work, e.g. with respect to the dimensioning of the hinge parts on the background of these parts optimally being constituted by rolled up projecting strip portions of a workpiece produced by punching, i.e. whereby these rolled up or cylindrical hinge part forming strip portions show the same material thickness as the remainder of the workpiece, while their diameter and axial length are determined mainly by requirements as to power transmission partly mutually between the chain links and partly between the single chain links and the driving sprockets as used in a given conveyor system for moving the chain. It is to be noticed that the relevant development has so far stopped at such a design of the links, whereby the rolled up cylindrical hinge parts show such length to width ratios and cooperate with hinge pins of such dimensions that the desired increased degree of pivotability has not been practically achievable.

The invention is based on the recognition that the hinge parts as conventionally designed show certain area portions which are in fact superfluous from a strength point of view, and which, in being removed, will provide for an increased lateral pivotability. These area portions are the laterally outermost rear portions of the central, cylindrical hinge part. The front side portion of this part serves to transfer the chain pull to or from the hinge pin, while the opposed rear portion thereof almost only serves to prevent the link from getting loose from the hinge, insofar as the hinge needs not resist considerble forces tending to push the chain links together.

Against this background it has been found that a considerably increased lateral pivotability is achievable when the outer rear side portions of the central hinge part are removed, while for the stability of the hinge it is sufficient for the remaining rear side portion to be a narrow central portion, which, as a half-ring, engages behind the hinge pin.

Figure 2:
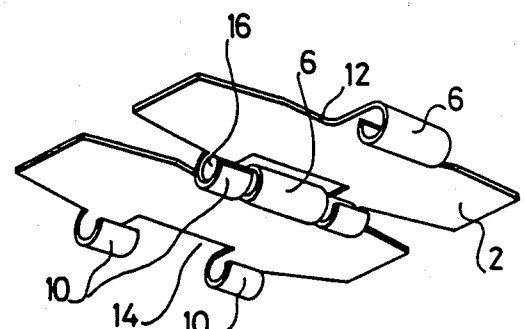
Figure 3:
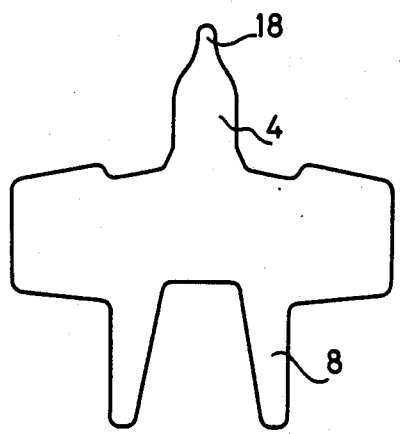
Figure 5:
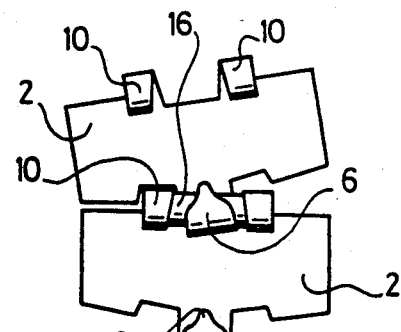
Figure 4:
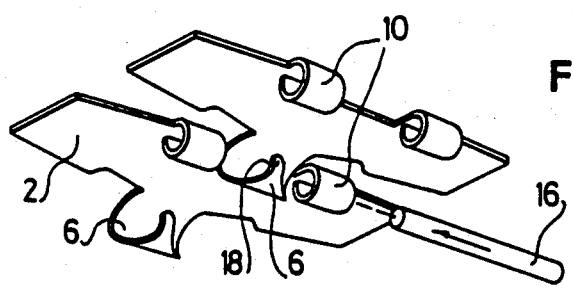

In the following the invention is described in more detail with reference to the drawing, in which:

FIG. 1 is a plan view of a chain link workpiece for a conventional chain link,

FIG. 2 is a perspective view of a pair of interhinged chain links as produced from workpieces of FIG. 1, FIG. 3 is a plan view of a chain link workpiece for a chain link conveyor according to the invention, FIG. 4 is a view similar to FIG. 2 of a pair of chain links according to the invention, and FIG. 5 is a plan view illustrating the lateral pivotability of chain links constructed in accordance with the present invention.

The chain link workpiece of FIG. 1 is punched out of a heavy stainless steel sheet having, for example, a thickness of 3 mm, with the workpiece including a generally laterally oriented main plate portion 2 having a forwardly projecting central strip portion 4, which, when rolled, forms a central hinge part 6 as shown in FIG. 2, and two rearwardly projecting strip portions 8, which, when rolled up, form outer hinge parts 10 as shown in FIG. 2. The front edge of the workpiece, i.e. the base edge of the central strip portion 4, is, at both sides of this strip portion 4, provided with a recess 12 for receiving the outer hinge parts 10 of the neighboring link, and correspondingly the rear edge of the workpiece, between the strip portions 8, is provided with a recess 14 for receiving the central hinge part 6 of the neighboring link. The consecutive chain links are hinged together by a hinge pin 16 projecting through the hinge parts 6, 10. The hinge pin 16 is fixed to the outer hinge parts 10, but the hinge otherwise shows a certain play enabling two neighboring chain links to pivot slightly, mutually, in the plane of the link plates about the middle of the hinge, because the hinge pin 16 fits loosely only in the central hinge portion 6, and because the axial length of the hinge portion 16 is somewhat smaller than the free distance between the outer hinge portions 10. For enabling such a lateral mutual pivoting of the chain links the link plates 2 are shaped with a laterally outwardly slightly oblique or converging form of the front and/or rear edges thereof.

In accordance with the invention, as shown in FIGS. 3-5, the link workpieces are provided with a slightly modified shape, while otherwise all other circumstances such as the diameter of the hinge parts 6, 10 and the dimensions and the locations of the hinge pins 16 are unchanged.

The main modification is that the outermost end portion 18 of the strip portion 4, for forming the central hinge part 6, is shaped with a considerably reduced width, while the base portion of the strip portion 4 is as wide as or only slightly narrower than the corresponding strip 4 of FIGS. 1-2. As clearly apparent from FIG. 4 the rear portion of the hinge part 6 will hereby constitute a narrow strip- or nose-shaped portion, which will be fully capable of holding the chain links against mutual separation by incidental forces seeking to force the links towards each other.

Now, the small width of the end portion 18 will account for the hinge pin 16 being horizontally pivotal through an angle, which is considerably larger than in FIGS. 1-2, where the pivotability is restricted by the broad outer end of the strip portion 4. It is only the outer end portion of the strip portion 4, or, in other words, only the rear portion of the hinge part 6 which is of considerably reduced width, so the hinge part 6 will still, through its broader base or front side portion, be able to transfer the normal operational pulling forces between the chain links, through the hinge pins 16.

When an increased lateral pivotability of the consecutive chain links is achievable, the links should of course also be otherwise designed so as to permit the increased pivotability, i.e. the outwardly converging front and rear edges of the chain links should be still more converging than in FIGS. 1-2, and the recesses 12 must have an increased depth, as also shown in FIG. 3.

As illustrated in FIG. 3 the transitional area between the broad base portion of the strip 4 and the narrow outer portion thereof may be smoothly converging, but the shape of this area is unimportant when only the hinge part has a broad front side and a narrow rear side.

It may of course be possible to further increase the pivotability by a die pressing of the parts, which form stop members for the pivoting. Thus, a slight pressing out of the interior lateral edges of the front side portion of the hinge part 6 would increase the pivotability without involving any mechanical weakening of the hinge. Generally, of course, the pivotability is conditioned by the hinge pin 16 not filling out the hinge part 6, but it is here unimportant whether it is the hinge part which is oversized or the hinge pin 16 which is undersized, by showing a reduced diameter between the outer hinge parts 10.

I claim:

1. A conveyor chain, the conveyor chain comprising a plurality of individual uniform sheet metal chain links adapted to be disposed consecutive to one another, transverse hinge pin means for linking consecutive chain links together through hinge parts provided on the chain links, the hinge parts including cylindrically rolled strip members protruding from respective front and rear edges of individual chain links in such a manner that the chain links of each pair of hinged chain links are mutually pivotable about a normally horizontal hinge pin and about a vertical axis through a mid-point of the hinge joint, the cylindrically rolled strip member on the front edge of the individual chain links, as viewed in a normal conveying direction, forms a middle hinge part in a central area of said front edge, and each middle hinge part is provided with a chain pulling transferring base portion along the front edge of the individual chain links of a larger width than a width of a portion formed by an outer end of the rolled strip member, with the width of the base portion tapering toward the outer end of the rolled strip member.

2. A conveyor chain according to claim 1, characterized in that the width of the outer end of the middle hinge part is about one-fourth of the width of the base portion of the hinge part.

3. A conveyor chain according to claim 2, characterized in that laterally projecting plate protions of the chain links are shaped such that the conveyor chain is horizontally bendable through curves having a radius of curvature of between 20 and 30 cm.

4. A conveyor chain according to claim 1, characterized in that laterally projecting plate portions of the chain links are shaped such that the conveyor chain is horizontally bendable through curves having a radius of curvature of between 20 and 30 cm.

* * * * *